(12) United States Patent
Hodder et al.

(10) Patent No.: US 11,055,078 B2
(45) Date of Patent: Jul. 6, 2021

(54) SYSTEMS AND METHODS FOR DEPLOYING SOFTWARE PRODUCTS TO ENVIRONMENTS

(71) Applicants: ATLASSIAN PTY LTD, Sydney (AU); ATLASSIAN, INC., San Francisco, CA (US)

(72) Inventors: Philip Mathew Arthur Hodder, Strathfield (AU); Jeroen Paul Magdalena De Raedt, Darlington (AU); Samuel Joseph Tannous, Moorebank (AU); Geoff Robert Crain, Summer Hill (AU); Nathan Wayne Burrell, Woy Woy (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/381,427

(22) Filed: Apr. 11, 2019

(65) Prior Publication Data

US 2020/0104107 A1    Apr. 2, 2020

Related U.S. Application Data

(60) Provisional application No. 62/737,943, filed on Sep. 28, 2018.

(51) Int. Cl.
*G06F 9/44* (2018.01)
*G06F 11/36* (2006.01)
(Continued)

(52) U.S. Cl.
CPC ............ *G06F 8/60* (2013.01); *G06F 8/71* (2013.01); *G06F 16/1774* (2019.01); *G06F 8/30* (2013.01);
(Continued)

(58) Field of Classification Search
CPC . G06F 21/121; G06F 8/60; G06F 8/71; G06F 8/65; G06F 8/40; G06F 8/30;
(Continued)

(56) References Cited

U.S. PATENT DOCUMENTS 8,037,453 B1 * 10/2011 Zawadzki ................. G06F 8/71
717/123
8,677,315 B1 * 3/2014 Anderson ............. G06F 9/4411
717/110
(Continued)

OTHER PUBLICATIONS

Dave Dice et al., Transactional Locking II, 2012, [Retrieved on Feb. 4, 2021], Retrieved from the internet: <URL: https://link.springer.com/chapter/10.1007/11864219_14> 15 Pages (194-208) (Year: 2006).*

*Primary Examiner* — Anibal Rivera
(74) *Attorney, Agent, or Firm* — Brownstein Hyatt Farber Schreck, LLP (57) ABSTRACT

Described herein is a computer-implemented method for deploying a software product to an environment. The method comprises defining an environment lock for the environment, the environment lock being configured to selectively prevent deployment of a software product to the environment. The method further comprises receiving a request from a requesting entity to deploy a designated software product to the environment, determining a status of the environment lock, and either permitting or preventing the deployment of the designated software product to the environment by reference to the determined status of the environment lock.

20 Claims, 6 Drawing Sheets

(51) Int. Cl.
*G06F 8/60* (2018.01)
*G06F 8/71* (2018.01)
*G06F 16/176* (2019.01)
*G06F 11/34* (2006.01)
*G06F 8/65* (2018.01)
*G06F 8/40* (2018.01)
*G06F 8/30* (2018.01)

(52) U.S. Cl.
CPC .............. *G06F 8/40* (2013.01); *G06F 8/65* (2013.01); *G06F 11/3409* (2013.01); *G06F 11/368* (2013.01)

(58) Field of Classification Search
CPC .. G06F 11/3409; G06F 11/36; G06F 11/3664; G06F 11/368
See application file for complete search history.

(56) References Cited

U.S. PATENT DOCUMENTS

| | | | |
|---|---|---|---|
| 9,419,856 B1* | 8/2016 | Chawla | H04L 41/082 |
| 9,893,940 B1* | 2/2018 | Chawla | H04L 41/0816 |
| 9,992,064 B1* | 6/2018 | Chawla | H04L 41/0866 |
| 10,146,524 B1* | 12/2018 | Killmon | G06F 8/65 |
| 10,268,709 B1* | 4/2019 | Suehs | G06F 16/211 |
| 10,318,285 B1* | 6/2019 | Jodoin | G06F 8/60 |
| 2003/0018694 A1* | 1/2003 | Chen | H04L 67/34 709/200 |
| 2003/0037173 A1* | 2/2003 | Pace | H04L 67/2823 719/310 |
| 2003/0050932 A1* | 3/2003 | Pace | G06Q 10/10 |
| 2003/0074207 A1* | 4/2003 | Pace | H04L 69/329 709/204 |
| 2003/0074360 A1* | 4/2003 | Chen | H04L 67/10 |
| 2003/0078958 A1* | 4/2003 | Pace | G06F 9/544 709/201 |
| 2003/0084134 A1* | 5/2003 | Pace | H04L 69/40 709/223 |
| 2006/0080656 A1* | 4/2006 | Cain | G06F 8/65 717/174 |
| 2012/0185913 A1* | 7/2012 | Martinez | H04L 12/66 726/1 |
| 2013/0091252 A1* | 4/2013 | Pizzorni | H04L 69/329 709/219 |
| 2013/0174117 A1* | 7/2013 | Watters | G06F 8/71 717/106 |
| 2013/0174124 A1* | 7/2013 | Watters | G06F 8/71 717/122 |
| 2013/0219361 A1* | 8/2013 | Fiebig | G06F 9/44 717/121 |
| 2014/0196044 A1* | 7/2014 | Fernando | G06F 9/5027 718/102 |
| 2014/0250306 A1* | 9/2014 | Ziegler | G06F 8/60 713/189 |
| 2014/0250419 A1* | 9/2014 | Ivmark | G06F 8/20 717/101 |
| 2017/0177322 A1* | 6/2017 | Clark | G06F 8/65 |
| 2018/0260429 A1* | 9/2018 | Bhargava | G06F 16/2343 |
| 2018/0276398 A1* | 9/2018 | Linton | G06F 21/121 |
| 2018/0322019 A1* | 11/2018 | Stowell | G06F 9/4843 |
| 2019/0171550 A1* | 6/2019 | Eizenman | G06F 11/3664 |
| 2019/0327271 A1* | 10/2019 | Saxena | G06N 3/0454 |
| 2019/0361688 A1* | 11/2019 | Chigakkagari | G06F 8/71 |
| 2020/0278920 A1* | 9/2020 | Khakare | G06F 9/5072 |

* cited by examiner

SYSTEMS AND METHODS FOR DEPLOYING SOFTWARE PRODUCTS TO ENVIRONMENTS

BENEFIT CLAIM

This application claims the benefit under 35 U.S.C. § 119(e) of provisional application 62/737,943 filed Sep. 28, 2018, the entire contents of which is hereby incorporated by reference for all purposes as if fully set forth herein.

TECHNICAL FIELD

Aspects of the present disclosure are directed to source code deployments, and in particular to deploying software products to environments.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Source code management (SCM) systems (also known as 'revision control' or 'version control' systems) provide a platform for the collaborative development, maintenance and updating of software. In some cases, SCM systems are augmented by continuous integration (CI) and/or continuous delivery/continuous deployment (CD) services. CI is a software development practice that requires developers to periodically integrate source code into a shared repository that is in turn managed by the SCM system. CD encompasses the practices of continuous delivery and continuous deployment. In this regard, continuous delivery involves the rapid, but sustainable release to customers of new changes to a software product. Using a continuous deployment model, every change to the software product, after being built from the modified source code files and passing (typically automated) testing, is automatically released to customers.

CI/CD practices can be integrated into a project by making appropriate entries in a configuration file for the project's repository. This configuration can be suitably located in the repository's root directory so that it can be versioned by the SCM system in the same way as the other files comprised in the repository.

The actual software products built from CI/CD services are deployed to one or more 'environments'. In this regard, separate environments are often created for the testing, staging and production stages of the software development lifecycle. A test environment is used to test the built software in order to identify errors or bugs in the source code from which the software was built. Typically, the source code is tested in all of the environments (e.g., operating systems, programs, devices) in which it will ultimately run.

Upon passing the testing phase, the software is deployed to a staging environment where performance of the source code is tested. When the source code passes the requirements of testing and staging, it is then deployed to the production environment, where for example it is made available for download from an app store or website.

However, difficulties can arise in the scenario when separate entities attempt to deploy a software product to the same environment at the same time. With current systems, the result of such a concurrent deployment tends to be non-deterministic and/or can result in unpredictable race conditions. Moreover, with the automation of build and deployment operations becoming more common with the steady uptake of CI/CD systems, the problem of concurrent deployments may consequently also increase.

SUMMARY

The appended claims may serve as a summary of the invention.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Overview

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

In the description below, Git (and Bitbucket) are used as an example SCM system for illustrative purposes. Git is a version control system used for software development and other version control tasks. A Git working directory is a repository that has complete history and revision tracking metadata and functions. It will be appreciated that the various features and techniques described herein could, with appropriate modifications, be used with alternative SCM systems (e.g., Mercurial and Subversion).

As noted above, source code typically progresses through four stages—development, testing, staging and production. As the name suggests, in the development stage, the source code is developed and often pushed to an SCM system. Generally speaking, developers work on the source code locally, often updating it multiple times before pushing the latest updated version of the source code to the SCM system. Each source code update is called a 'commit' in Git.

Once the latest source code commit is pushed to the SCM system, it typically passes to the testing stage (either automatically in the case of CI or manually) where various tests are run on the source code to identify errors or bugs in the source code. Typically, the source code is tested in all the environments (e.g., operating systems, programs, devices) it will ultimately be deployed in. Upon passing the testing phase, the source code integration enters the staging process—where performance of the source code is tested. When the source code passes all these stages, it enters the production stage, also known as the live stage, where customers can interact directly with the source code.

As noted previously, continuous integration (CI) is the practice of merging working copies of source code from multiple software developers into a shared repository periodically and then using a CI management system to automatically test/deploy the updated source code in one or more deployment environments that correspond to three of the software development stages—testing, staging and production.

However, as noted above, particularly with the uptake of CI/CD systems, the scenario where separate entities attempt to deploy a software product to the same environment at the same time is becoming more likely. To address one or more of the difficulties associated with instances of concurrent deployments, aspects of the present disclosure provide a method and system for deploying a software product to an environment.

In broad terms, the method comprises defining an environment lock for the environment to which software is to be deployed. The environment lock functions to selectively prevent deployments of software to the environment. When a request is received to deploy a software product to the environment, the request is verified by applying the environment lock to the request to either permit or prevent the deployment of the designated software product to the environment.

According to some embodiments, when a deployment step is scheduled to be run, the verification is performed by the requesting entity (such as a deployment step) seeking to acquire ownership of the environment lock. If a lock is available, it is acquired by the deployment step, with the environment being marked as "locked". Locking the environment in this way ensures that other deployment steps are unable to execute.

Once the deployment step completes, it releases the lock. This then allows for other deployment steps to acquire the lock as needed.

An environment lock has an "owner" and the system is configured to ensure that an environment lock can only be unlocked by its owner.

Some of the advantages of preferred aspects of the present disclosure include the fact that the implemented concurrency controls do not affect other unrelated steps that may be executing in the same repository. This is particularly important in CI/CD systems that allow for an arbitrary number of steps to be run.

In addition, concurrency controls according to preferred aspects of the present disclosure have the effect of attaching concurrency controls to a specified environment. Such an environment is global across the repository, so if another plan (such as a Pipeline plan) is run on the repository, it is automatically subject to the same concurrency controls.

A yet further advantage lies in the fact that no additional configuration is required to enforce deployment concurrency. A pipeline only needs to define a deployment step (and the environment it is using).

In addition, concurrency controls according to preferred aspects of the present disclosure provide additional safeguards around a particular environment that prevent any deployments thereto, apart from those permitted by the environment lock. For example, preferred aspects of the present disclosure prevent deployments made using manual FTP processes and the like.

Further still, limiting concurrent deployments to the same environment gives developers more confidence to practice CI/CD and are thus better placed to realise the advantages that those practices can provide.

One example CI management system in which features of the present disclosure may be implemented is Bitbucket Pipelines, which is commercially available from Atlassian. Bitbucket Pipelines is integrated with Bitbucket (Atlassian's SCM system). In the description below, Bitbucket Pipelines is used as an example CI management system and Bitbucket is used as an example SCM system for illustrative purposes. It will be appreciated that the various feature and techniques described herein could, with appropriate modifications, be used with alternative CI management systems and SCM systems (e.g., TravisCI, Wercker, buildkite, and Jenkins)

Environment Overview

Figure 1:
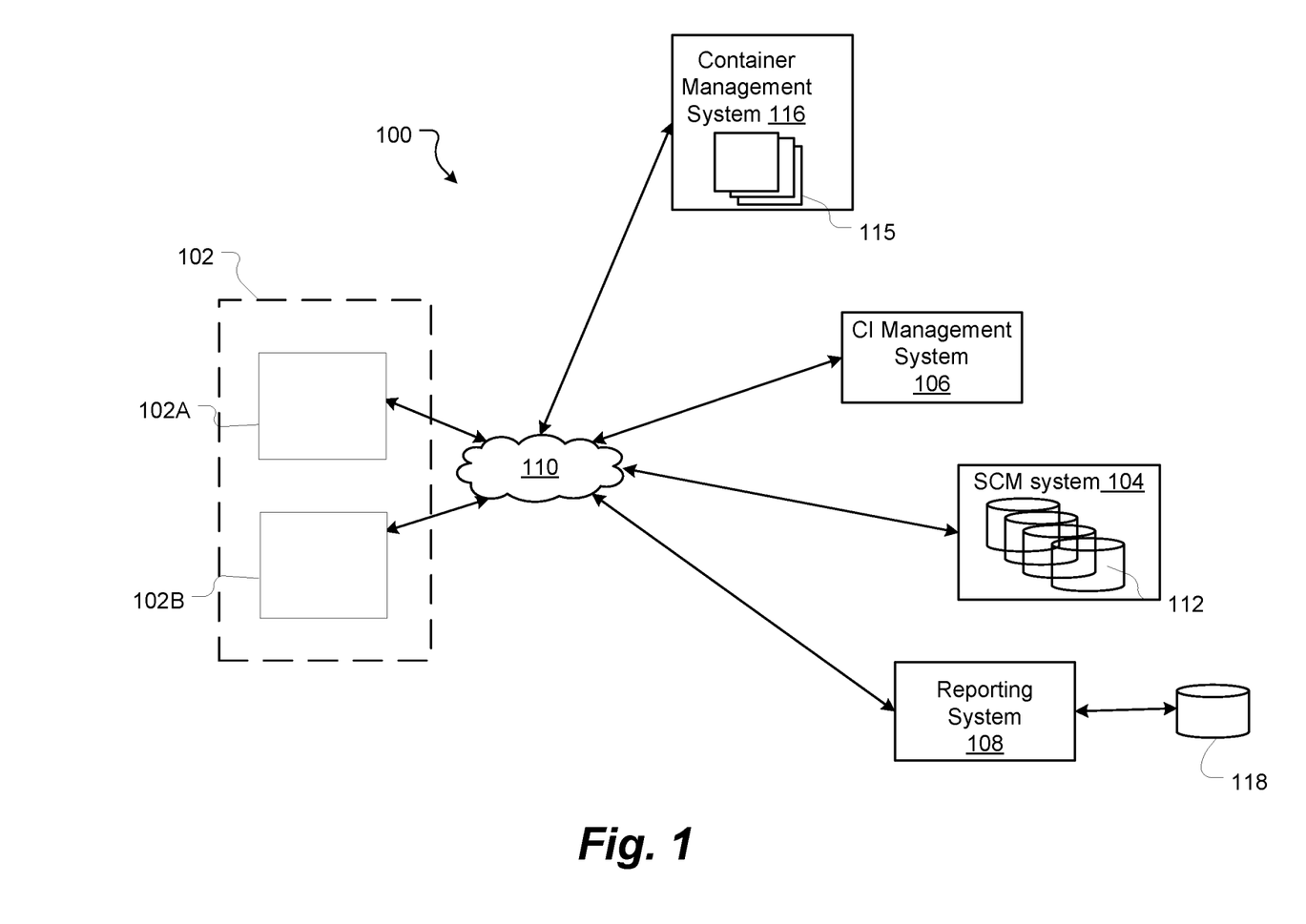
FIG. 1 is a block diagram illustrating a network environment in which aspects of the present disclosure may be implemented.

FIG. 1 illustrates a networked infrastructure 100 in which aspects of the present disclosure are implemented. The infrastructure 100 includes one or more client devices 102, a source code management (SCM) system 104 and a CI management system 106, and a reporting system 108. The client devices 102, SCM system 104, CI management system 106 and reporting system 108 communicate with each other over one or more communication networks 110.

Generally, the systems depicted in FIG. 1 communicate with each other to update source code, build software products from the updated source code and deploy those (in some cases automatically) to designated environments.

In particular, the SCM system 104 stores source code repositories 112 (hereinafter referred to as repositories 112) and manages their content. It also receives/responds to requests from client devices 102 and the CI management system 106 to retrieve/store data in the repositories 112. For example, the SCM system 104 may notify the CI management system 106 when a user commits/pushes an update to source code in a repository 112. In addition, the SCM system 104 may receive a request from the CI management system 106 to access source code from a repository 112 that has recently been updated. The SCM system 104, in response, may retrieve the requested source code and forward it to the CI management system 106.

The repositories 112 may include multiple versions of source code files and associated metadata. Often a particular repository may store source code files corresponding to a particular software application and/or software development team.

The client devices 102 are configured to communicate with the SCM system 104, the CI management system 106, and the reporting system 108. To that end, in certain embodiments, the client devices 102 include various installed applications such as an SCM client (not shown), a CI client (not shown) and/or a reporting client (not shown).

The SCM client may be configured to create local working copies of source code; modify the working copies; commit/push changes made in the working copies to the SCM system 104 (so that the changes are written to the relevant repository 112); fetch (e.g. pull) files from a repository 112 the developer has access to; provide a user interface for reading/writing source code and deployment description.

The CI client may be configured to allow communication between the client device 102 and the CI management system 106. For example, it may allow a developer to register an SCM repository 112 for CI with the CI management system 106.

The reporting client may be utilized to, for example, view/track history of source code deployments executed by the CI management system 106, promote specific source code integrations from one environment to another, view summary of source code integrations along with any issues associated with that particular integration, etc.

In certain embodiments, instead of one or more of these dedicated clients, the client device 102 simply includes a web browser client and communicates with the SCM system 104, the CI management system 106, and/or the reporting system 108 via the web browser client.

Only two client devices (102A and 102B) have been illustrated, but normal operation typically involves many more client devices connected to the various other systems in FIG. 1.

The client devices 102 may communicate with the other systems in infrastructure 100 via suitable communication networks 110. For example, the client devices 102 may communicate with the SCM system 104 via private or public networks, and with the CI management system 106 and the reporting system 108 via public networks. It will be appreciated that based on the required implementation, any suitable communication network 110 may be utilized to allow communication between the systems in environment 100.

As described in detail below, the CI management system 106 manages builds and deployments. Specifically, the CI management system 106 detects whether source code in a repository 112 that is registered for continuous integration is updated, retrieves the corresponding deployment description from the repository 112, initializes one or more deployment environments to receive a software product built from the updated source code, and deploys the software product to the initialized environment based on the deployment description. The CI management system 106 also releases the environment once the deployment is complete.

To deploy software products built from one of the various repositories 112 to a suitable deployment environment, the CI management system 106 utilizes one or more computing resources. In some embodiments, the CI management system 106 utilizes a cloud-based container management system 116 (such as 'Docker') for these purposes, with the CI management system facilitating the creation or one or more deployment environments 115 (which are typically containers) on the container management system 116.

Alternatively, the CI management system 106 utilizes dedicated on-premises computing resources (not shown) operatively connected to the CI management system 106 for the deployment of software products.

The reporting system 108 receives/retrieves information related to source code deployments from the CI management system 106 and stores this information in a database, such as in the deployment database 118 shown in FIG. 1. Further, it is configured to forward this information to client devices 102 as and when deployment information is requested by developers and other interested parties, such as project managers, IT support, etc. The information may be communicated to the interested parties via any known communication means such as email, SMS, instant message. Alternatively, the information is made accessible on a web server, which the interested parties can access through dedicated clients or web browsers on their client devices 102.

In FIG. 1 the SCM system 104, CI management system 106 and reporting system 108 have been depicted as separate systems communicating over one or more networks 110. These systems (or their functionality) may, however, be divided over any number of physical systems communicating in any appropriate manner. By way of example, the functionality of the CI management system 106 and the reporting system 108 may be combined and hosted as a single system.

In the case of the Bitbucket Pipelines CI management system, a repository's build and deployment configurations are typically defined in a configuration file. A suitable configuration file (specified in the YAML data serialization language) that implements the concurrency control mechanisms according to an embodiment of the present disclosure is as follows:

```
pipelines:
    default:
        - step:
            name: Build and test
            script:
                - ./run-build
                -./run-tests
        - step:
            name: Deploy to staging
            deployment: staging
            script:
                - ./deploy-to-staging
        - step:
            name: Deploy to production
            deployment: production
            script:
                - ./deploy-to-production
```

The keywords noted in the listing are:
pipelines: marks the commencement of the applicable pipeline definitions. Each pipeline is comprised of a set of steps, which are executed in response to a commit being entered in the repository. The specific pipeline that is executed is dependent on the section of the configuration file in which the pipeline is listed.
default: is a listing of the steps that are executed in response to every commit.
step: is a definition of a build execution unit that defines the commands executed and the settings of a unique container. In this regard, each step in a pipeline executes as a separate container (in the current disclosure being a Docker container) with a clone of the repository.
name: defines a name for a step to assist with encapsulating the step's function. In this regard, the steps in the above build configuration are respectively named Build and test, Deploy to staging and Deploy to production
deployment: sets the type of environment for a step. Example values include: test (for a test environment); staging (for a staging environment); and production (for a production environment).
script: is a listing of commands that are sequentially executed in order to perform a build. In the above build configuration, four programs are listed, being:
 'run-build'—a program that runs a build of the project in the repository;
 'run-tests'—a program that runs testing of the software product generated by the run-build program;
 'deploy-to-staging'—a program that deploys the built software product to a staging environment; and
 deploy-to-production—a program that deploys the built software product to a production environment.

According to the present disclosure, the deployment step described above can be understood as a job (i.e a Deployment Job). A Deployment Job is an entity with the following attributes:

```
DeploymentJob: {
    deploymentJobUuid: Uuid,
    environmentUuid: Uuid
}
```

More specifically, a DeploymentJob includes universally unique identifiers for the DeploymentJob itself, and for an environment.

In regards to environments, according to the present disclosure, an environment can be defined as having the following attributes.

```
Environment: {
    uuid: Uuid,
    accountUuid: Uuid,
    repositoryUuid: Uuid,
    name: String,
    slug: String,
    rank: int,
    creationDate: OffsetDateTime,
    lock: OpenLock | ClosedLock
}
```

Alternatively, an environment can be defined as having just the following attributes

```
Environment: {
    environmentUuid: Uuid,
    name: String,
    lock: OpenLock | ClosedLock
}
```

More specifically, an environment includes:
universally unique identifiers—for each of the environment itself (namely uuid or environmentUuid), SCM system account and repository;
name: an environment name;
slug—a user friendly network resource identifier for the environment;
rank—a numerical indication of the environment's position in a hierarchy;
creationDate—the date of creation of the environment;
lock—a lock attribute used to manage multiple concurrent deployments to the environment. A lock is an inherited class of either OpenLock or ClosedLock.

When users wish to deploy to a particular environment, it is referenced in the 'step' that will perform the deployment. The present disclosure encapsulates the concept of an environment which represents the infrastructure to which the software product is to be deployed. For example, the concept of an environment is represented with attributes such as 'name' and a 'lock'.

An OpenLock can be an object with no fields, or can have the following attributes:

```
OpenLock: {
    type: OPEN,
    isLocked: boolean,
    lockOpener: PipelineDeployment|LockExpirationInteractor
}
```

In this regard, an OpenLock type includes:
type—set to the value OPEN;
isLocked—indicating whether the OpenLock is locked;
lockOpener: the identity of the owner of the lock, which is either PipelineDeployment or LockExpirationInteractor;

Likewise, a ClosedLock is a data structure with the following attributes:

```
ClosedLock: {
    type: CLOSED.
    isLocked: boolean,
    lockTime: OffsetDateTime,
    owner: PipelineDeployment,
    lastInteractor: PipelineDeployment
}
```

In this regard, an ClosedLock type includes:
type—set to the value Closed;
isLocked—indicating whether the ClosedLock is locked;
lockTime—indicating when the lock was closed;
owner—the identity of the owner of the lock, of type PipelineDeployment;
lastInteractor—the identity of the last interactor with the lock, of type PipelineDeployment.

Alternatively, a ClosedLock can just have the attributes of lockTime and owner, in which case the owner is of type LockOwner (described below).

The PipelineDeployment type is a data structure with the following attributes:

```
PipelineDeployment: {
    type: PIPELINE_DEPLOYMENT,
    pipelineUuid: Uuid,
    stepUuid: Uuid
}
```

In this regard, a PipelineDeployment includes:
type—set to the value PIPELINE DEPLOYMENT;
universally unique identifiers for each of the pipeline and the step.

Likewise, the LockExpirationInteractor type is a data structure with the following attributes:

```
LockExpirationInteractor: {
    type: LOCK_EXPIRATION
}
```

In this regard, a LockExpirationInteractor includes a type set to the value LOCK_EXPIRATION.

As noted above, a ClosedLock can include just the attributes of lockTime and owner (of type LockOwner). The LockOwner type is a data structure with a universally unique identifier (named deploymentJobUuid) as an attribute that identifies the Deployment Job that is the owner of the lock.

The following is an example of an environment with all fields populated (with a ClosedLock)

```
Environment: {
    environmentUuid: 'adadad-12345-67890',
    name: 'Production',
    lock: { # We'll use a ClosedLock here.
        lockTime: '2018-11-04T09:38:53Z'
        owner: {
            deploymentJobUuid: 'eeddaa-11223-66778',
```

```
        }
      }
    }
}
```

Figure 2:
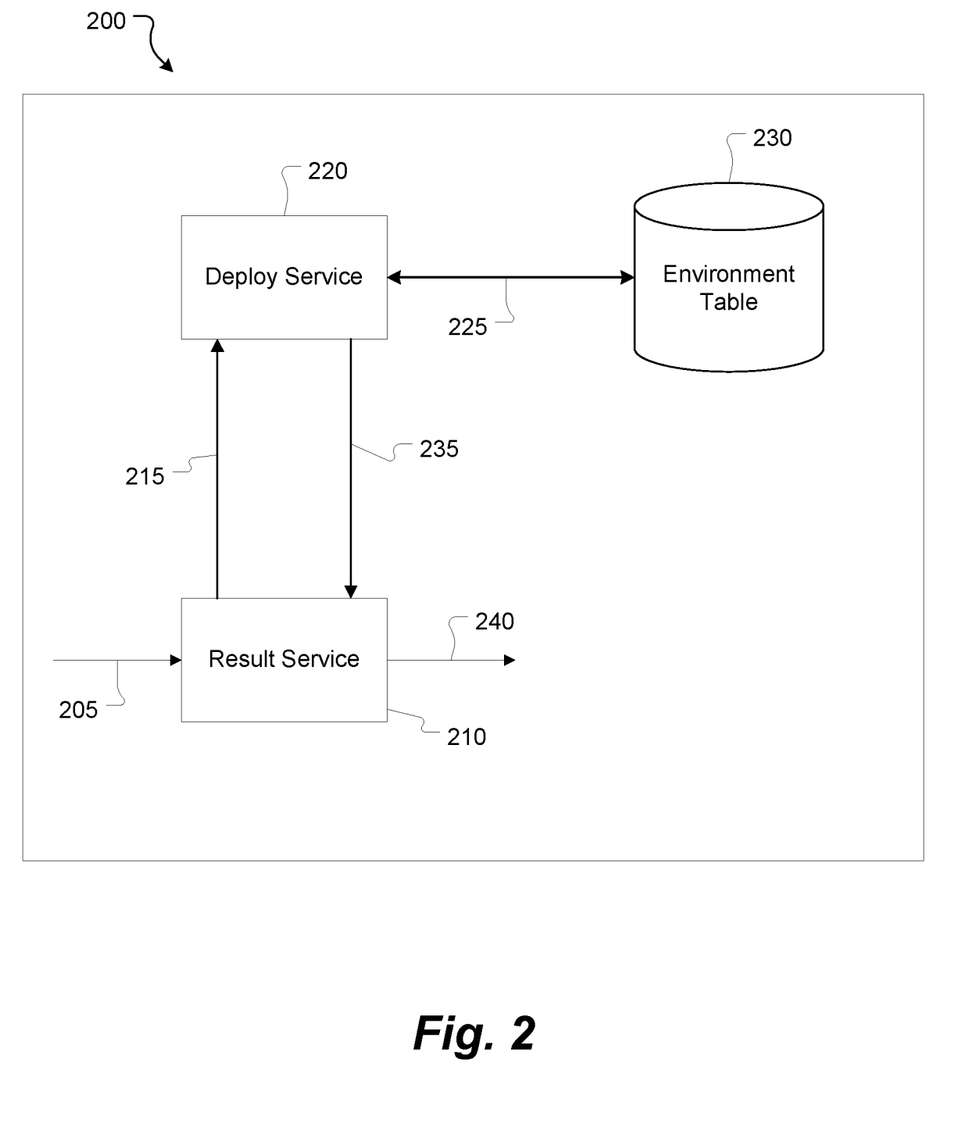
FIG. 2 is a schematic system diagram in which aspects of the present disclosure may be implemented.

A schematic diagram of a system 200 suitable for practising the methods of the present disclosure is shown in FIG. 2.

System 200 includes a Result Service 210 (or "Build Service") that receives system event notifications 205. Result Service 210 is communicatively coupled by way of communication channels 215 and 235 to a Deploy Service 220 (or "Environment Service"). Deploy Service 220 is configured to receive service requests over communication channel 215 from the Result Service 210 and transmit responses thereto over communication channel 235. In order to respond to the service requests, Deploy Service 220 interrogates a database 230 that maintains an Environment Table. Database 230 is accessible to Deploy Service 220 by way of a communication channel 225. Communication channels 215, 225, and 235 may be realized in any appropriate manner, for example programmatically where the Result and Deploy Services 210 and 220 are part of the same system.

According to the present embodiment, system 200 is implemented on the CI management system 106. The Services 210 and 220 and table 230 of system 200 could, however, be implemented on one or more separate systems/platforms.

Acquiring a Lock

Figure 3:
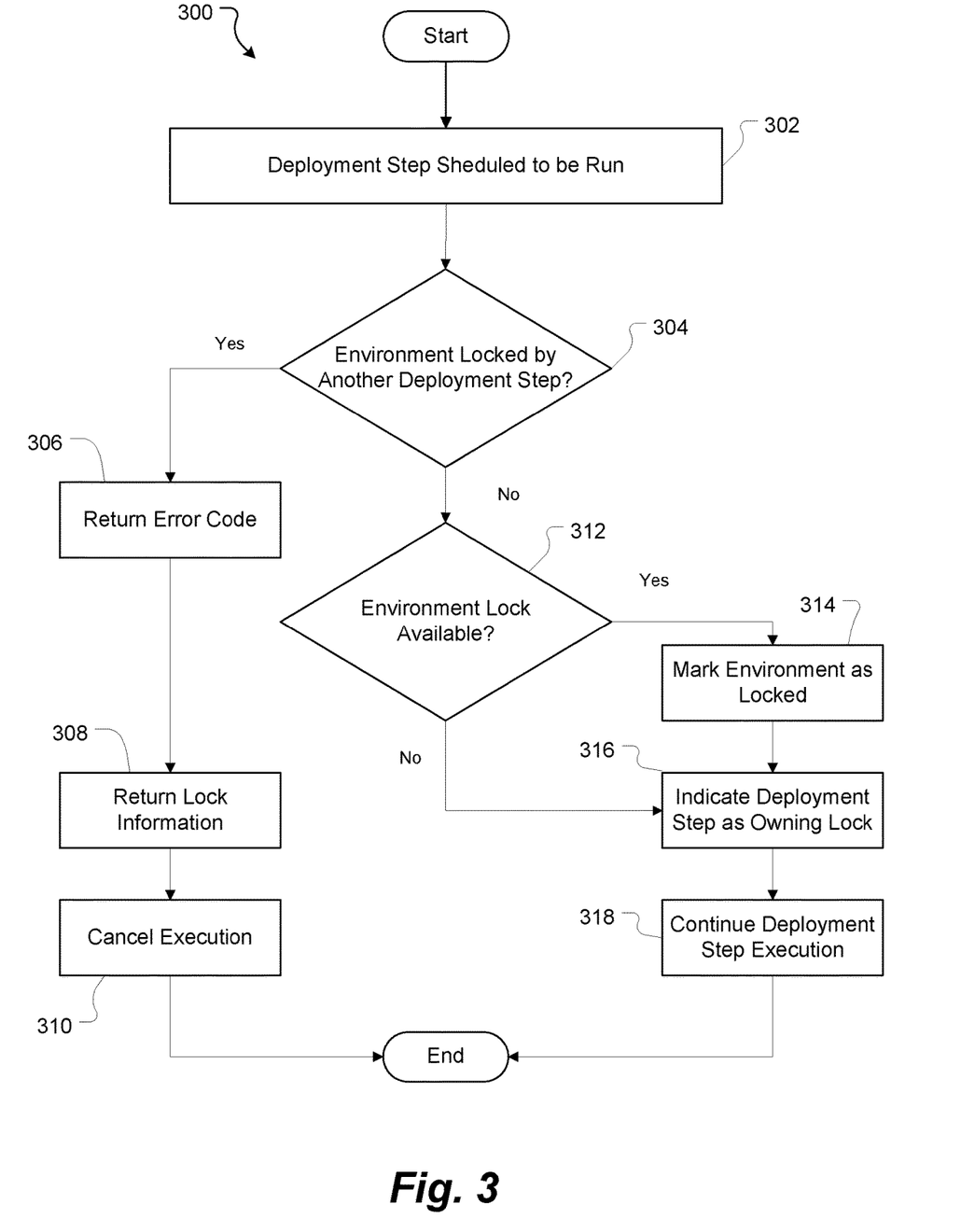
FIG. 3 is a flowchart illustrating an example method for acquiring environment locks according to aspects of the present disclosure.

FIG. 3 is a flowchart illustrating an example lock acquisition method 300 using one or more of the systems described with reference to FIGS. 1 and 2.

The method commences at step 302 when a deployment step (or Deployment Job, such as the Deploy to staging or Deploy to production steps defined above) is scheduled to be run. Result Service 210 responds to this event by performing several checks before allowing the job to enter an execution phase. Such checks typically include determining if the account and repository are enabled on pipelines, and if the account has build minutes available to run the job.

At execution phase, the scheduled deployment step notifies Result Service 210 which in turn issues a call (such as a REST request) over communication channel 215 to Deploy Service 220. The call to Deploy Service 220 includes a request for an environment lock that is applicable to the environment to which the deployment step is scheduled to deploy its software product (e.g. staging or production). The request includes the environmentUuid and deploymentJobUuid from the DeploymentJob, thus indicating that the scheduled DeploymentJob wishes to deploy to the specified environment.

Upon receipt of the call, Deploy Service 220 retrieves the Environment from the Database 230, using the environmentUuid provided by the DeploymentJob. It then inspects the Environment's 'lock' property and makes a determination (step 304) of whether the designated environment (namely the environment the subject of the request) is already locked by another deployment step. Deploy Service 220 performs this determination by issuing a suitable query to the Environment Table maintained on Database 230.

The Environment table typically includes fields for storing the following data:
repositoryUuid—a unique identifier for the relevant repositories (which allows the collection of environments that belong to a single repository);
environmentUuid—a unique identifier of a single environment; and
version—an identifier that is incremented when the table is updated so as to prevent multiple simultaneous writes to the table.

Data stored in the Environment Table also includes the value of the 'lock' attribute of the designated environment, that value indicating whether the lock is an OpenLock or a ClosedLock, and the respective identities of the lockOpener (for an OpenLock object having fields) and owner. In addition, each deployment step includes identification information, which assists the Deploy Service 220 to determine the identity of the deployment step that "owns" the environment lock.

In this regard, a DeploymentJob object contains the necessary identifying information in its deploymentJobUuid attribute. The deploymentJobUuid is also used as the identifier (of type PipelinesDeploymentLockInteractor) of the environment lock.

The Deploy Service 220 responds to the Result Service 210 with the pertinent information from the Environment Table. In the event that the returned information indicates that the designated environment is already locked by another deployment step, Deploy Service 220 returns an Error Code (step 306) to the Result Service 210. DeployService 220 also returns lock information to the Result Service 210 (step 308), which includes details of the deployment step that currently owns the environment lock. Step 308 can be performed as part of operation 306, in that the error response can also contain the lock information. In this regard, the relevant HTTP response can contain the status code indicating the error, and the response body can contain the lock information.

The Result Service 210 then cancels execution of the scheduled deployment (step 310) while adding information about the current owner of the environment lock for the UI to link to the other deployment step that blocked the execution of the scheduled deployment step.

In the event that the returned information indicates that the designated environment is not already locked by another deployment step, the process proceeds to step 312, at which a determination is made of whether the environment lock is available.

Deploy Service 220 is responsible for making the determination and does so by retrieving from Database 230, the environment to which the deployment step wishes to deploy. Deploy Service 220 then checks the lock status by examining the 'lock' property of the retrieved environment and the 'type' property of the examined lock.

If the lock is of type OpenLock, then it is immediately 'claimed' by the deployment step. Claiming is performed by creating a new ClosedLock object, with the 'owner' attribute set as a new LockOwner and the 'deploymentJobUuid' attribute set as the same value as the 'deploymentJobUuid' attribute on the DeploymentJob.

The newly created ClosedLock is then added to the environment, thereby replacing the old OpenLock. In turn, the environment is written to Database 230 with the updated lock field. Deploy Service 220 then returns a success code to Result Service 210, which then continues with the step setup execution.

In the event that the lock is of type ClosedLock, then Deploy Service 220 makes an additional check on the lock object, inspecting the 'lastInteractor' field.

If the 'lastInteractor' is a PipelineDeploymentLockInteractor, then the 'deploymentJobUuid' is examined. If the deploymentJobUuid matches that of the DeploymentJob, it is tantamount to a successful response to Result Service 210. No database update is required in this instance, as the environment is already in the correct state.

If the deploymentJobUuid does not match that of the DeplomentJob, then an error code and lock information is returned to Result Service 210, which causes the cancellation of execution (step 310).

In the event of a positive determination (namely that the environment lock is available), Deploy Service 220 marks the environment as locked (step 314) by assigning a value of ClosedLock to the designated environment's lock attribute. The operation also assigns the 'owner' on the ClosedLock to be the appropriate value identifying the DeploymentJob.

As noted above, a ClosedLock data type includes attributes storing information not only about the deployment step that owns the lock, but also about when the lock was acquired (namely the lockTime attribute).

If another deployment step was scheduled to be run while the environment lock was already claimed by the deployment step that Deploy Service 220 used to lock the environment (as discussed above), the determination operation 304 would return a result that the environment was already locked by another deployment step.

Returning to the method description, the Deploy Service 220 next indicates that the scheduled deployment step (or DeploymentJob) is the owner of the environment lock (step 316) by assigning the scheduled deployment step to the owner attribute of the lock (or assigning the DeploymentJob's 'deploymentJobUuid' attribute to the LockOwner's 'deploymentJobUuid' attribute, in which case the LockOwner is then assigned to the 'owner' property of the environment lock).

The deployment step is then free to continue its execution (step 318).

Returning to step 312, if the determination indicates that the environment lock is not available, this is indicative that the environment is already locked by the requesting deployment step. In this scenario, the Deploy Service does not mark the environment as locked, as the lock attribute already accurately reflects the state of the environment lock (namely that it is owned by the requesting deployment step).

The method proceeds to step 316, at which the Deploy Service 220 indicates that the scheduled deployment step owns the environment lock. This is to inform the scheduled step that it is able to continue its scheduled execution. The indication can also be used in support of retry operations, such as those necessitated by failed networking requests between Result Service 210 and Deploy Service 220. Likewise, the scheduling operation commenced with the receipt of system notifications 205 may need to be retried if these other errors occur.

The deployment step is then free to continue its execution (step 318).

Releasing a Lock

Figure 4:
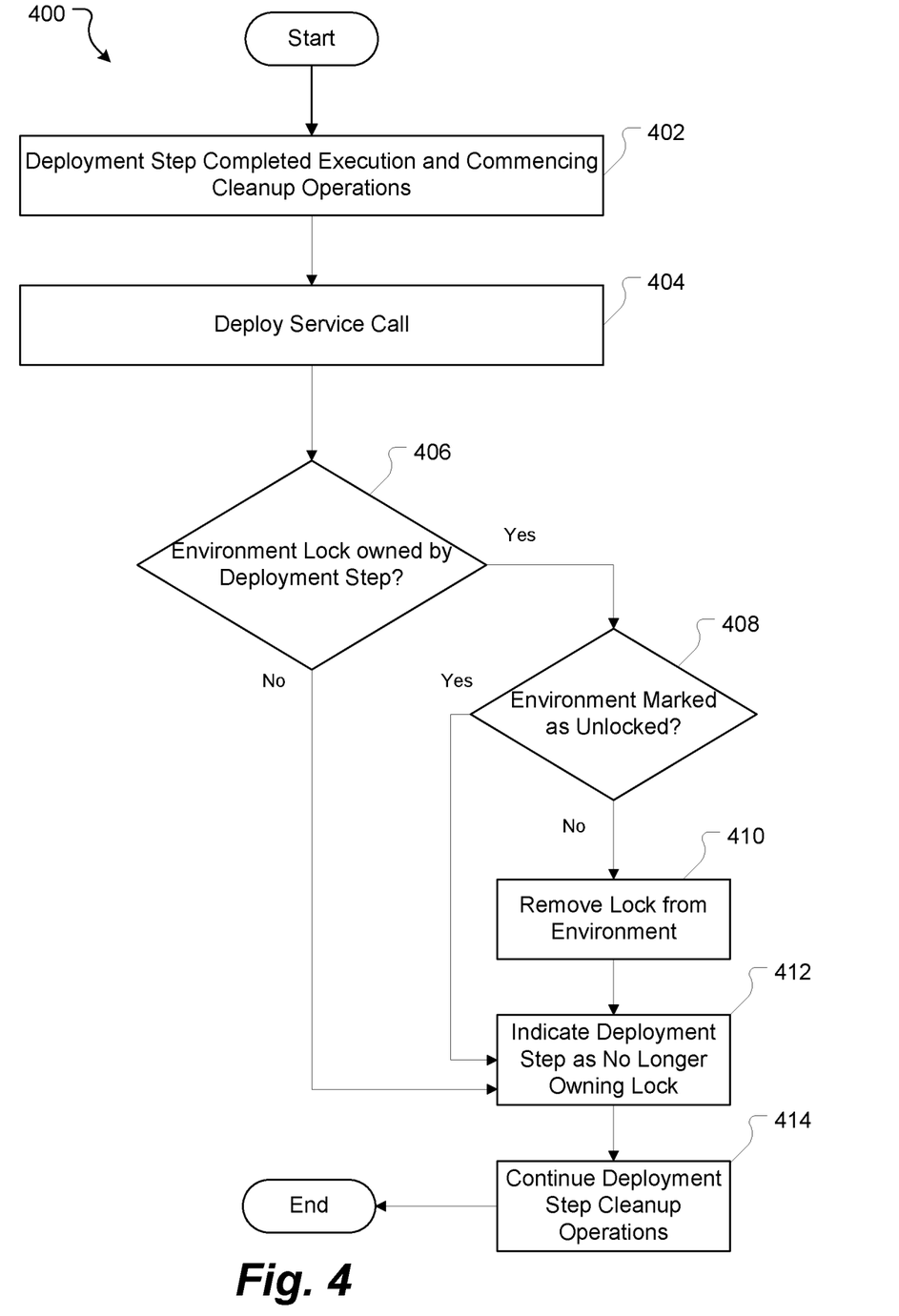
FIG. 4 is a flowchart illustrating an example method for releasing environment locks according to aspects of the present disclosure.

FIG. 4 is a flowchart illustrating an example lock releasing method 500 using one or more of the systems described with reference to FIGS. 1 and 2.

The method commences at step 402 at which a deployment step has completed its execution and begun its cleanup operations. The deployment step notifies Result Service 210 of the completion and identifies itself (using its uuID) and the environment to which the deployment was made (namely the designated environment, again using the relevant uuID). Result Service 210 issues a call (typically by way of a REST request) (step 404) to Deploy Service 220 that includes information that the deployment to the designated environment (such as production) has completed and thus the Environment Lock is no longer required. The request includes the environmentUuid of the Environment to unlock, and the deploymentJobUuid. Both fields are supplied from the DeploymentJob.

Upon receipt of the request, Deploy Service 220 retrieves the Environment from Database 330 using the environmentUuid the DeploymentJob provided. It then inspects the Environment's 'lock' property and (at step 406) makes a determination of whether the deployment step owns the environment lock in place on the designated environment. Deploy Service 220 performs this determination by issuing a suitable query to the Environment Table maintained on Database 230. As noted above, data stored in the Environment Table includes, in the 'lock' attribute of the designated environment, the identity of a lockOpener of an OpenLock and of the owner of a ClosedLock.

If the 'lock' field is a ClosedLock, the 'owner' field of the ClosedLock is inspected. Using the identifying information that Result Service 210 provided in its request, Deploy Service 220 compares the deploymentJobUuid with the value stored in the LockOwner field.

If the value of the deploymentJobUuid in the DeploymentJob matches with the deploymentJobUuid on the LockOwner, Deploy Service 220 creates a new OpenLock object, and assigns it to the Environment's lock property, thereby removing the ClosedLock.

The Environment is then written (using a conditional write operation) to the Environment Database Table, updating the old Environment. Utilising conditional write operations for database updates prevents the occurrence of concurrent write operations. The failure of a conditional write is indicative of another process thread in Deploy Service 220 having operated on the Environment table. In order to ensure that the Environment is in an expected state, Deploy Service 220 may return an error code to Result Service 210 indicating the conflict. Result Service 210 retries write operations after returning the error code.

The Deploy Service 220 also responds to the Result Service 210 with the pertinent information from the Environment Table. In the event that the information indicates that the deployment step is the owner of the environment lock, a further determination is made (step 408) as to whether the environment is marked as unlocked. Step 408 is performed in the context of environment locks that may expire for particular environments (see below).

In the event that the environment is not marked as unlocked, the Deploy Service 220 removes the lock from the environment (step 410) and indicates to the deployment step that it no longer owns the environment lock (step 412).

The deployment step is then free to continue its cleanup operations (step 414).

In the event that the environment is marked as unlocked, the method proceeds directly to step 412 with Deploy Service 220 making no changes to the lock status of the environment, but rather indicating that the environment is unlocked. Again, the deployment step is free to continue its cleanup operations.

Returning to determination step 406, in the event that the information received from the Deploy Service indicates that the environment lock is not owned by the requesting deployment step (but by another step), the process proceeds to step 412, with Deploy Service 220 making no changes to the lock status of the environment, but rather indicating to the deployment step that it no longer owns the environment lock. Again, the deployment step is free to continue its cleanup operations at 414.

Lock Expiration

Figure 5:
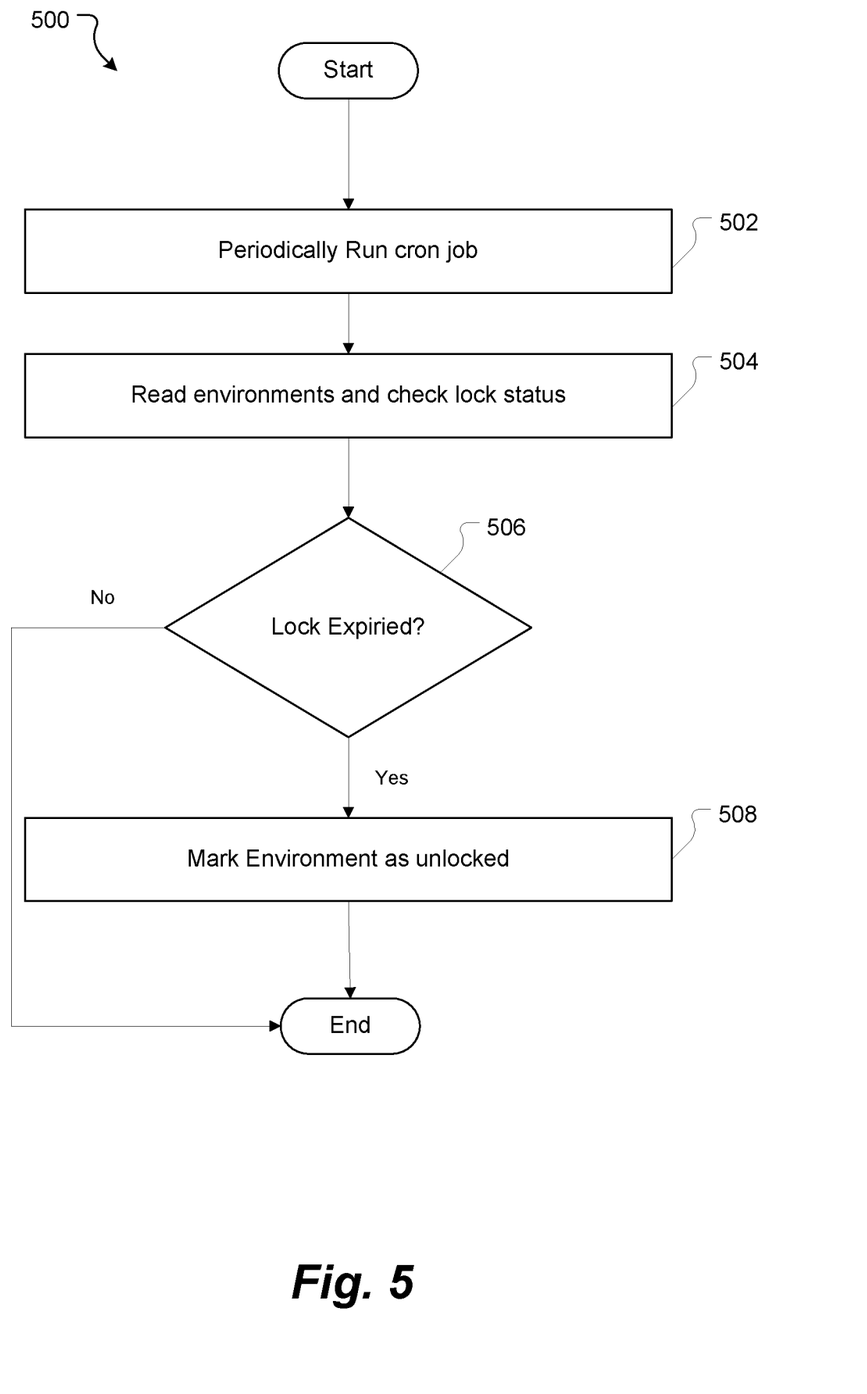
FIG. 5 is a flowchart illustrating an example method for implementing an environment lock expiry methodology according to aspects of the present disclosure.

FIG. 5 is a flowchart illustrating an example lock expiration method 500 using one or more of the systems described with reference to FIGS. 1 and 2.

The process commences at step 502, with the running of a scheduled job (scheduled using cron or any other suitable time-based scheduler utility) at the expiration of a suitable time period (e.g every 5 minutes). This Cron job triggers Deploy Service 220 to unlock environments, as deemed appropriate by Deploy Service 220.

At step 504, the Deploy Service 220 interrogates the Environment Database 230 for information about all environments maintained thereon and the lock status for each environment.

For each environment, a determination is made at step 506 as to whether the environment lock for the environment in question has expired. The determination is made by reference to the lockTime attribute of a ClosedLock. In general, a lock will expire if it is of a certain age (e.g over 3 hours old).

Any environments having an expired lock are marked (in the isLocked attribute) as unlocked (step 508). Alternatively (step 508), an OpenLock object is created and assigned to the lock field of the Environment. The Environment is then written to the Environment database table, (updating the old value) with a conditional write. As noted above, this prevents the occurrence of concurrent write operations. Regardless of whether the concurrent write passes or fails, the operation is completed for that Environment. Should the write have failed, it will be retried on the next Cron job trigger.

Otherwise, no changes are made to any environment lock that has not expired.

Hardware Overview

The operations/techniques described herein are implemented by one or more special-purpose computing systems or devices. For example, in networked infrastructure 100: SCM system 104 may be provided by a computer system; the client devices 102 are computer systems; the CI management system 106 is provided by one or more computer systems; the reporting system 108 is provided by one or more distributed computing systems, and the computing resources on the container management system 116 are also provided by one or more computer systems.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 6:
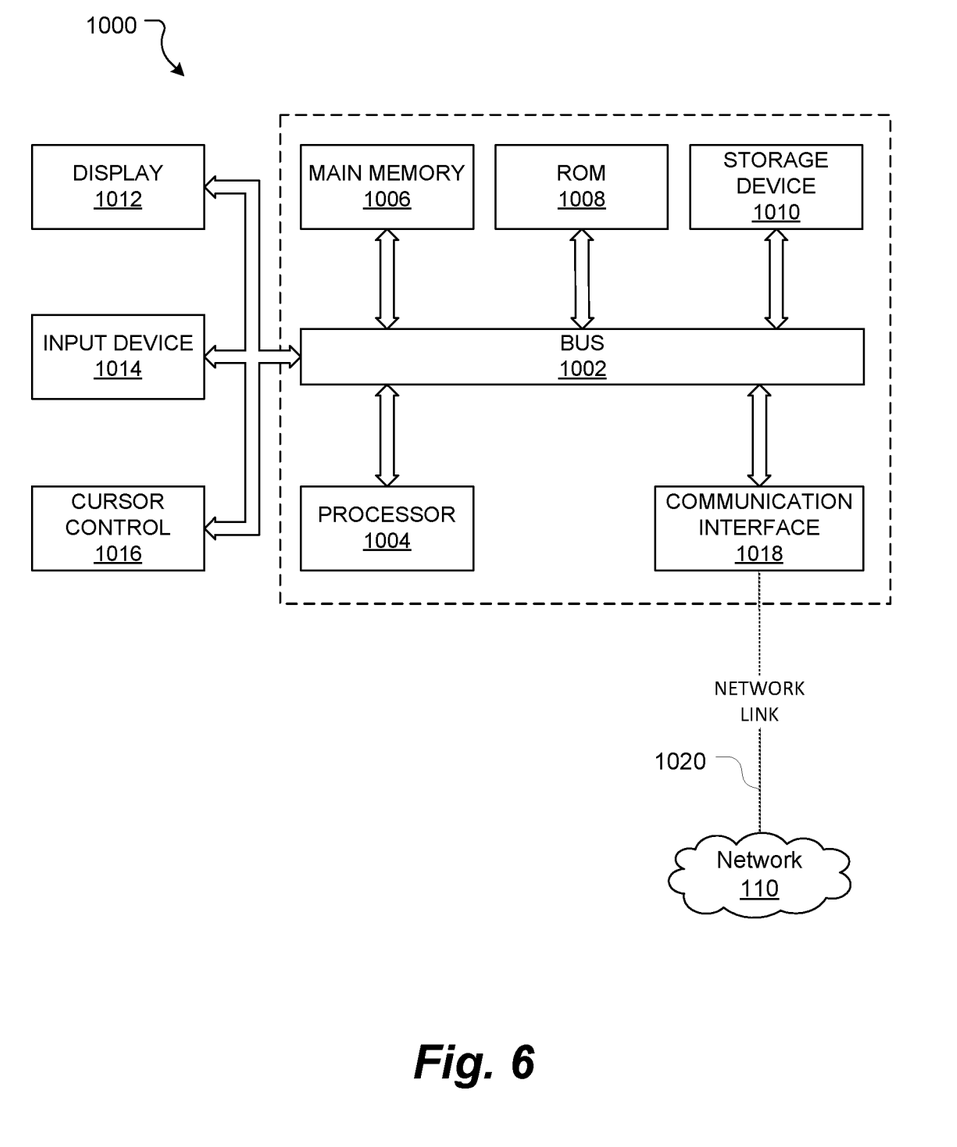
FIG. 6 is a block diagram illustrating a computer system, which may be used to implement various embodiments of the present disclosure.

By way of example, FIG. 10 provides a block diagram that illustrates one example of a computer system 1000 upon which embodiments of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor, a graphical processing unit, or other processing unit.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

In case the computer system 1000 is the client device 102, the computer system 1000 may be coupled via bus 1002 to a display 1012 (such as an LCD, LED, touch screen display or other display), for displaying information to a computer user. An input device 1014, including alphanumeric and other keys, may be coupled to the bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment, the techniques herein are performed by computer system 1000 in response to processor 1004 executing one or more sequences of one or more instructions contained in main memory 1006. Such instructions may be read into main memory 1006 from another storage medium, such as a remote database. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Computer system 1000 also includes a communication interface 1018 coupled to bus 1002. Communication interface 1018 provides a two-way data communication coupling to a network link 1020 that is connected to the communication network 110. For example, communication interface 1018 may be an integrated services digital network (ISDN) card, cable modem, satellite modem, etc. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Computer system 1000 can send messages and receive data, including program code, through the network(s) 110, network link 1020 and communication interface 1018. In case the computer system hosts the CI management system 106, the computer system 1000 may receive an event notification from the SCM system 104 via the network 110, network link 1020, and communication interface 1018. The received event notification may be executed by processor 1004 as it is received, and/or stored in storage device 1010, or other non-volatile storage for later execution.

As described previously, the computer system 1000 as described above may be configured in a plurality of useful arrangements. In one arrangement, the computer system 1000 is a server computer (such as a computer system hosting the CI management system 106) comprising one or more non-transitory computer-readable data storage media stored with one or more sequences of instructions/software modules which when executed cause the computer to perform the operations/techniques that are described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A computer-implemented method for deploying a software product to an environment, the method comprising:
   receiving a request from a requesting entity to deploy a designated software product to an environment, the requesting entity comprising a deployment step that is scheduled to execute in the environment;
   identifying a repository within a database associated with the environment;
   evaluating a status of an environment lock associated with the repository;
   in response to the status of the environment lock being evaluated as locked, preventing deployment of the designated software product to the environment; and
   in response to the status of the environment lock being evaluated as available:
      permitting deployment of the designated software product to the environment;
      updating the status of the environment lock to be marked as locked;
      assigning an identifier of the deployment step to an owner attribute associated with the repository, the owner attribute identifying that the deployment step is an owner of the environmental lock; and
   in response to receiving an indication from the deployment step that it has completed deploying the designated software product:
      confirming that the deployment step is the owner of the lock; and
      updating the status of the environmental lock to be marked as available.

2. The method according to claim 1, wherein the status of the environment lock is part of the attribute of the environment.

3. The method according to claim 1, wherein, after the status of the environment lock is marked as locked, deployment of the designated software product to the environment is permitted for the requesting entity assigned to the attribute of the environment.

4. The method according to claim 3, wherein the environment lock is either locked or marked as available.

5. The method according to claim 4, further including the steps of:
   receiving a notification from the requesting entity that the permitted deployment to the environment has completed; and
   modifying the owner attribute to reflect that the deployment step is no longer assigned to the owner attribute.

6. The method according to claim 1, wherein the environment is at least one of a staging environment or a production environment.

7. The method according to claim 1, wherein the request is a deployment command to be executed within one or more of a continuous integration service or a continuous deployment service.

8. The method according to claim 7, wherein the environment is running on-premises or in a public cloud.

9. A system for deploying a software product to an environment, the system comprising:
   a processor;
   a non-transitory computer-readable storage medium storing sequences of instructions, which when executed by the processor, cause the processor to:

receive a request from a requesting entity to deploy a designated software product to the environment, the requesting entity comprising a deployment step tht is scheduled to execute in the environment;

identify a repository within a database associated with the environment;

evaluate a status of an environment lock associated with the repository;

in response to the status of the environment lock being evaluated as locked, prevent deployment of the designated software product to the environment; and in response to the status of the environment lock being evaluated as available:

permit deployment of the designated software product to the environment;

update the status of the environment lock to be marked as locked; and assign an identifier of the deployment step to an owner attribute associated with the repository, the owner attribute indicating that the deployment step owns the environmental lock; and in response to the deployment step indicating that it has completed deploying the designated software product:

confirming that the deployment step is the owner of the lock; and' updating the status of the environmental lock to be marked as available.

10. The system according to claim 9, wherein the status of the environment lock is part of the attribute of the environment.

11. The system according to claim 9, wherein, after the status of the environment lock is marked as locked, deployment of the designated software product to the environment is permitted for the requesting entity assigned to the attribute of the environment.

12. The system according to claim 11, wherein the environment lock is either locked or marked as available.

13. The system according to claim 12, wherein the sequences of instructions, which when executed by the processor, further cause the processor to:

receive a notification from the requesting entity that the permitted deployment to the environment has completed; and modify the owner attribute to reflect that the deployment step is no longer assigned to the owner attribute.

14. The system according to claim 9, wherein the environment is at least one of a staging environment or a production environment.

15. The system according to claim 9, wherein the request is a deployment command to be executed within one or more of a continuous integration service or a continuous deployment service.

16. The system according to claim 15, wherein the environment is running on-premises or in a public cloud.

17. A non-transitory computer-readable storage medium storing one or more sequences of instructions, which when executed by a processor, cause the processor to:

receive a request from a requesting entity to deploy a designated software product to an environment, the requesting entity comprising a deployment step that is scheduled to execute in the environment;

identify a repository within a database associated with the environment;

evaluate a status of an environment lock associated with the repository;

in response to the status of the environment lock being evaluated as available:

permit deployment of the designated software product to the environment;

update the status of the environment lock to be marked as locked; and assign an identifier of the deployment step to an owner attribute associated with the repository, the owner attribute indicating that the deployment step owns the environmental lock; and in response to the deployment step indicating that it has completed deploying the designated software product:

confirming that the deployment step is the owner of the lock; and updating the status of the environmental lock to be marked as available.

18. The non-transitory computer-readable storage medium of claim 17, wherein the status of the environment lock is part of the attribute of the environment.

19. The non-transitory computer-readable storage medium of claim 17, wherein deployment of the designated software product to the environment is permitted for the requesting entity assigned to the attribute of the environment.

20. The non-transitory computer-readable storage medium of claim 19, wherein the environment lock is either locked or marked as available.

* * * * *